(12) United States Patent
Mori et al.

(10) Patent No.: US 12,375,615 B2
(45) Date of Patent: Jul. 29, 2025

(54) READING APPARATUS, METHOD OF CONTROLLING READING APPARATUS, AND NON-TRANSITORY COMPUTER-READABLE STORAGE MEDIUM STORING PROGRAM CAUSING COMPUTER TO CONTROL READING APPARATUS TO CORRECT READING POSITION OF DOCUMENT

(71) Applicant: SEIKO EPSON CORPORATION, Tokyo (JP)

(72) Inventors: Kazunori Mori, Matsumoto (JP); Yutaro Kajitani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,843

(22) Filed: Jan. 25, 2022

(65) Prior Publication Data

US 2022/0239798 A1    Jul. 28, 2022

(30) Foreign Application Priority Data

Jan. 27, 2021    (JP) ................................ 2021-010999

(51) Int. Cl.
*H04N 1/12*        (2006.01)
*H04N 1/00*        (2006.01)
*H04N 1/028*       (2006.01)

(52) U.S. Cl.
CPC ......... *H04N 1/124* (2013.01); *H04N 1/00588* (2013.01); *H04N 1/00702* (2013.01); *H04N 1/0071* (2013.01); *H04N 1/125* (2013.01)

(58) Field of Classification Search
CPC .......... H04N 1/00588; H04N 1/00702; H04N 1/0071; H04N 1/124; H04N 1/125
USPC ......................................... 358/474, 409, 498
See application file for complete search history.

(56) References Cited

U.S. PATENT DOCUMENTS

| 6,809,796 | B2 | 10/2004 | Sugeta | |
|---|---|---|---|---|
| 2003/0231288 | A1 | 12/2003 | Sugeta | |
| 2004/0165227 | A1* | 8/2004 | Makino | ................ H04N 1/1235 358/488 |

(Continued)

FOREIGN PATENT DOCUMENTS

| CN | 1469624 | 1/2004 |
|---|---|---|
| JP | 3134773 B | 12/2000 |

(Continued)

*Primary Examiner* — Chad Dickerson
(74) *Attorney, Agent, or Firm* — WORKMAN NYDEGGER

(57) ABSTRACT

A scanner includes a second glass member, a main body frame, a sheet member, a document transport unit, a reading unit, and a control unit. The sheet member is arranged on the second glass member. The document transport unit transports a document such that the document is brought into contact with the second glass member in a first position and the document is brought into contact with the second glass member in a second position. The reading unit reads the document in a third position between the first position and the second position, the third position in which the document is out of contact with the sheet member and the second glass member. The control unit identifies the third position in accordance with a position of the sheet member detected by the reading unit.

17 Claims, 9 Drawing Sheets

(56) References Cited

U.S. PATENT DOCUMENTS

| | | | | |
|---|---|---|---|---|
| 2010/0142007 A1* | 6/2010 | Seto | ................... | H04N 1/00572 |
| | | | | 358/474 |
| 2010/0277776 A1* | 11/2010 | Osakabe | ................ | H04N 1/047 |
| | | | | 358/474 |
| 2012/0105921 A1* | 5/2012 | Ikari | .................. | H04N 1/00005 |
| | | | | 358/474 |
| 2018/0352102 A1* | 12/2018 | Matsumoto | ........ | H04N 1/00994 |
| 2019/0116285 A1* | 4/2019 | Ito | ........................ | H04N 1/0473 |

FOREIGN PATENT DOCUMENTS

| | | | |
|---|---|---|---|
| JP | 2012075006 A | * | 4/2012 |
| JP | 2017-011650 A | | 1/2017 |

* cited by examiner

READING APPARATUS, METHOD OF CONTROLLING READING APPARATUS, AND NON-TRANSITORY COMPUTER-READABLE STORAGE MEDIUM STORING PROGRAM CAUSING COMPUTER TO CONTROL READING APPARATUS TO CORRECT READING POSITION OF DOCUMENT

The present application is based on, and claims priority from JP Application Serial Number 2021-010999, filed Jan. 27, 2021, the disclosure of which is hereby incorporated by reference herein in its entirety.

BACKGROUND

1. Technical Field

The present disclosure relates to a reading apparatus, a method of controlling the reading apparatus, and a non-transitory computer-readable storage medium storing a program causing a computer to control the reading apparatus.

2. Related Art

An image reading apparatus in JP-A-2017-11650 includes a sheet material forming a clearance between a document transported by a document transport device and a first document glass to prevent contact between the document and the first document glass. The image reading apparatus thus reads the document in non-contact state by a reading unit.

In a case of adopting a method in which a position at a predetermined distance away from a reference position of a main body of the apparatus is set as a reading position in the image reading apparatus of JP-A-2017-11650, there is a risk that the orientation of the document being in contact with the sheet material may be changed due to a misalignment of the sheet material attached on the glass, which changes the distance between the document and the glass in the reading position, and consequently the document cannot be read correctly.

SUMMARY

A reading apparatus according to the present disclosure is a reading apparatus including: a transparent member; a frame surrounding the transparent member; a plate-shaped member arranged on the transparent member; a transport unit transporting a document such that the document is brought into contact with the transparent member in a first position in a transport direction of the document and the document is brought into contact with the plate-shaped member in a second position in the transport direction; a reading unit that is provided with respect to the transparent member to be configured to move in a moving direction along the transport direction and that reads the document; and a control unit controlling movement and reading operation of the reading unit. The reading unit reads the document transported by the transport unit in a third position between the first position and the second position in the moving direction, the third position in which the document is out of contact with the plate-shaped member and the transparent member, and the control unit identifies the third position in accordance with a position of the plate-shaped member detected by the reading unit.

A method of controlling a reading apparatus according to the present disclosure is a method including a transparent member, a frame surrounding the transparent member, a plate-shaped member arranged on the transparent member, a transport unit transporting a document such that the document is brought into contact with the transparent member in a first position in a transport direction of the document and the document is brought into contact with the plate-shaped member in a second position in the transport direction, a reading unit that is provided with respect to the transparent member to be configured to move in a moving direction along the transport direction and that reads the document in a reading position, and a control unit controlling movement and reading operation of the reading unit. The method includes: detecting a position of the plate-shaped member by reading the plate-shaped member while moving the reading unit; identifying, based on a detected position of the plate-shaped member, the reading position; and reading the document by the reading unit in the reading position that is identified.

A program of a reading apparatus according to the present disclosure is a non-transitory computer-readable storage medium storing a program causing a computer to control a reading apparatus including a transparent member, a frame surrounding the transparent member, a plate-shaped member arranged on the transparent member, a transport unit transporting a document such that the document is brought into contact with the transparent member in a first position in a transport direction of the document and the document is brought into contact with the plate-shaped member in a second position in the transport direction, a reading unit that is provided with respect to the transparent member to be configured to move in a moving direction along the transport direction and that reads the document in a reading position, and a control unit controlling movement and reading operation of the reading unit. The program includes: detecting a position of the plate-shaped member by reading the plate-shaped member while moving the reading unit; identifying, based on a detected position of the plate-shaped member, the reading position; and reading the document by the reading unit in the reading position that is identified.

DESCRIPTION OF EXEMPLARY EMBODIMENTS

Figure 1:
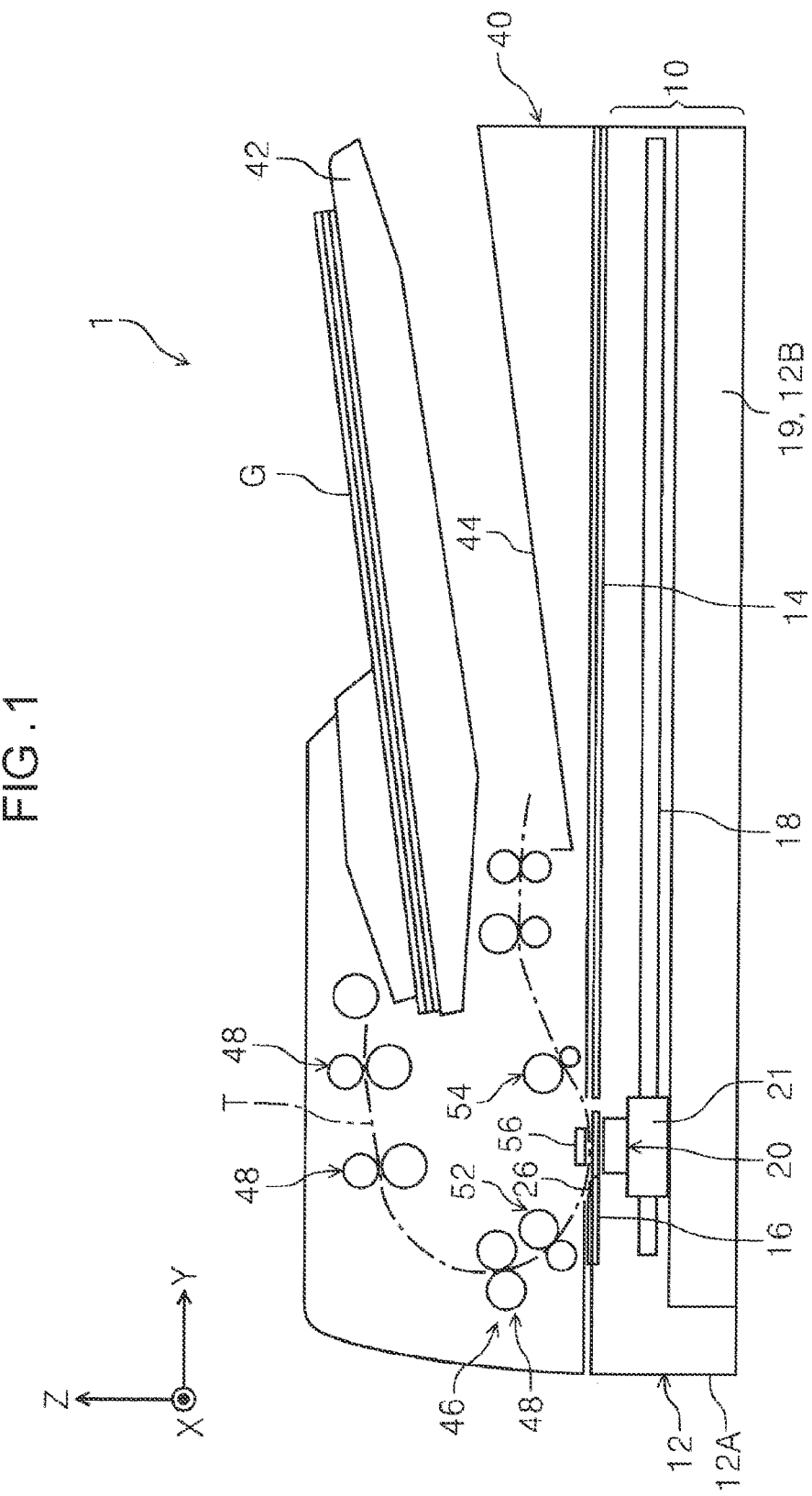
FIG. 1 is a configuration diagram of a scanner of Embodiment 1.

The present disclosure is schematically described below.

A reading apparatus of a first aspect is a reading apparatus, including: a transparent member; a frame surrounding the transparent member; a plate-shaped member arranged on the transparent member; a transport unit transporting a document such that the document is brought into contact with the transparent member in a first position in a transport direction of the document and the document is brought into contact with the plate-shaped member in a second position in the transport direction; a reading unit that is provided with respect to the transparent member to be configured to move in a moving direction along the transport direction and that reads the document; and a control unit controlling movement and reading operation of the reading unit. The reading unit reads the document transported by the transport unit in a third position between the first position and the second position in the moving direction, the third position in which the document is out of contact with the plate-shaped member and the transparent member, and the control unit identifies the third position in accordance with a position of the plate-shaped member detected by the reading unit.

According to this aspect, the third position as a reading position is identified according to a detection position of the plate-shaped member. In this case, even when the plate-shaped member is misaligned, the third position is kept in a position at a substantially constant distance away from the plate-shaped member, and thus the distance between the document and the transparent member in the reading position is maintained. Consequently, it is possible to correctly read the document.

A reading apparatus of a second aspect is the reading apparatus according to the first aspect, in which, based on data on a second size obtained from the reading unit, the second size having a width direction size orthogonal to the moving direction smaller than a width direction size of a first size, the control unit detects a position of the plate-shaped member, and the first size is a maximum size of the document configured to be read by the reading unit.

According to this aspect, the position of the plate-shaped member is detected based on the second size proportionally smaller than the first size. Consequently, it is possible to increase the speed of processing required to detect the plate-shaped member.

A reading apparatus of a third aspect is the reading apparatus according to the second aspect, in which the control unit causes, during the movement of the reading unit, the reading unit to perform reading for shading correction and reading for detection of a position of the plate-shaped member, and in the width direction, a reading size for the shading correction is greater than a reading size for the detection of a position of the plate-shaped member.

According to this aspect, the third position can be identified by using a result of the shading correction performed. Consequently, it is possible to accurately identify the third position.

A reading apparatus of a fourth aspect is the reading apparatus according to the second or third aspect, in which a reference member identifying a position of the reading unit in the moving direction is provided on the frame, and the control unit detects a position of the plate-shaped member based on data on a position overlapped with the reference member in the width direction.

According to this aspect, since the position of the plate-shaped member is detected based on data on a position overlapped with the reference member, even when the reading unit is tilted in the width direction, variation in the reading position in the moving direction due to the tilt of the reading unit can be reduced. Consequently, it is possible to accurately identify the third position.

A reading apparatus of a fifth aspect is the reading apparatus according to the fourth aspect, in which a shaft along the moving direction that guides the reading unit during the movement is provided in the frame, and based on data on a position overlapped with the shaft in the width direction, the control unit detects a position of the plate-shaped member.

According to this aspect, since the reference member can be arranged close to the shaft having a relatively small amount of the tilt with respect to the width direction of the reading unit, the effect of the tilt of the reading unit during the reading is reduced. Consequently, it is possible to accurately identify the third position.

A reading apparatus of a sixth aspect is the reading apparatus according to any one of the first to fifth aspects, in which the control unit causes the reading unit to read the document in either one of a first mode and a second mode that have different resolutions in the transport direction, and the third position in the first mode and the third position in the second mode are set to a same position.

According to this aspect, there is no need to execute processing of setting the third position in each of the first mode and the second mode. Consequently, it is possible to shorten the processing time for setting the third position.

A reading apparatus of a seventh aspect is the reading apparatus according to any one of the first to fifth aspects, in which the control unit causes the reading unit to read the document in either one of a first mode and a second mode that have different resolutions in the transport direction, and the third position in the first mode and the third position in the second mode are set to different positions.

According to this aspect, it is possible to set a position proper for a resolution of each of the first mode and the second mode as the third position.

A reading apparatus of an eighth aspect is the reading apparatus according to any one of the first to seventh aspects, in which the transport unit includes a background member in a position facing the transparent member, and a color of the background member is different from a color of the plate-shaped member.

According to this aspect, since the color of the plate-shaped member is different from the color of the background member, it is possible to make it easy to optically detect the plate-shaped member.

A reading apparatus of a ninth aspect is the reading apparatus according to any one of the first to eighth aspects, in which the plate-shaped member is fixed on the transparent member by an adhesive layer, and the adhesive layer is not provided between one of edge portions of the plate-shaped member that is closer to the second position and the transparent member.

According to this aspect, when the plate-shaped member is fixed on the transparent member with the adhesive layer in between, even if the adhesive layer protrudes outside a fixing target region on the inner side of the plate-shaped member, the adhesive layer is held in a space in which no adhesive layer is provided, and thus the protrusion of the adhesive layer outside the edge portion of the plate-shaped member can be inhibited. Consequently, it is possible to inhibit reduction in the accuracy of detecting the position of the plate-shaped member.

A reading apparatus of a tenth aspect is the reading apparatus according to the ninth aspect depending on the eighth aspect, in which a color of an adhesive layer is different from the color of the background member.

According to this aspect, even when the adhesive layer reaches the edge portion of the plate-shaped member, since the color of the adhesive layer is different from the background member, it is possible to reduce the possibility of false detection of the plate-shaped member as the background member.

A reading apparatus of an eleventh aspect is the reading apparatus according to any one of the first to tenth aspects, in which the control unit changes the third position in accordance with a number of the document transported by the transport unit.

It is predicted that abrasion of the plate-shaped member is progressed as the number of the documents transported by the transport unit is increased. In this case, according to this aspect, even when the abrasion of the plate-shaped member is progressed, the third position as the reading position can be corrected with reference to the plate-shaped member by changing the third position in accordance with the number of the documents. Consequently, it is possible to read the document in an optimal position.

A reading apparatus of a twelfth aspect is the reading apparatus according to any one of the first to eleventh aspects, in which, when a number of the document transported by the transport unit exceeds a predetermined number, the control unit causes the reading unit to read the plate-shaped member and detects abrasion of the plate-shaped member in accordance with a detected position of the plate-shaped member.

According to this aspect, the abrasion state of the plate-shaped member can be detected. Consequently, it is possible to encourage replacement of the plate-shaped member.

A method of controlling a reading apparatus of a thirteenth aspect is a method of controlling a reading apparatus including a transparent member, a frame surrounding the transparent member, a plate-shaped member arranged on the transparent member, a transport unit transporting a document such that the document is brought into contact with the transparent member in a first position in a transport direction of the document and the document is brought into contact with the plate-shaped member in a second position in the transport direction, a reading unit that is provided with respect to the transparent member to be configured to move in a moving direction along the transport direction and that reads the document in a reading position, and a control unit controlling movement and reading operation of the reading unit. The method includes: detecting a position of the plate-shaped member by reading the plate-shaped member while moving the reading unit; identifying, based on a detected position of the plate-shaped member, the reading position; and reading the document by the reading unit in the reading position that is identified.

According to this aspect, it is possible to obtain operations and effects similar to that of the reading apparatus according to the first aspect.

A program of controlling a reading apparatus of a fourteenth aspect is a non-transitory computer-readable storage medium storing a program causing a computer to control a reading apparatus including a transparent member, a frame surrounding the transparent member, a plate-shaped member arranged on the transparent member, a transport unit transporting a document such that the document is brought into contact with the transparent member in a first position in a transport direction of the document and the document is brought into contact with the plate-shaped member in a second position in the transport direction, a reading unit that is provided with respect to the transparent member to be configured to move in a moving direction along the transport direction and that reads the document in a reading position, and a control unit controlling movement and reading operation of the reading unit. The program includes: detecting a position of the plate-shaped member by reading the plate-shaped member while moving the reading unit; identifying, based on a detected position of the plate-shaped member, the reading position; and reading the document by the reading unit in the reading position that is identified.

According to this aspect, it is possible to obtain operations and effects similar to that of the reading apparatus according to the first aspect.

Embodiments 1 and 2 that are examples of a reading apparatus, a method of controlling the reading apparatus, and a non-transitory computer-readable storage medium storing a program causing a computer to control the reading apparatus according to the present disclosure are described below in detail.

Embodiment 1

FIG. 1 illustrates a scanner 1 as an example of a reading apparatus.

The scanner 1 includes an image reading apparatus 10 reading information on a document G and an automatic transport device 40 arranged above the image reading apparatus 10. The scanner 1 reads information on the document G mounted on the image reading apparatus 10 or the document G transported by the automatic transport device 40.

In an X-Y-Z coordinate system indicated in each of the drawings, an X direction is a device-depth direction, a Y direction is a device-width direction, and a Z direction is a device-height direction. The X direction, the Y direction, and the Z direction are orthogonal to each other. The X direction is an example of a width direction of the document G.

When a distinction is made between left and right with respect to the center in the device-width direction in a view from the front of the scanner 1, the left is a −Y direction, and the right is a +Y direction. When a distinction is made between front and rear with respect to the center in the device-depth direction, the front is a +X direction, and the rear is a −X direction. When a distinction is made between top and bottom with respect to the center in the device-height direction, the top is a +Z direction, and the bottom is a −Z direction. In the following descriptions, the +Z direction may be referred to as upward, and the −Z direction may be referred to as downward.

The automatic transport device 40 includes a document tray 42 on which multiple pieces of the documents G are set, a discharge tray 44 onto which the documents G after the information is read in a reading position is discharged, and a document transport unit 46 transporting the documents G from the document tray 42 to the discharge tray 44.

The automatic transport device 40 feeds the documents G to a reading region one by one. The automatic transport device 40 is coupled to the image reading apparatus 10 so as to be able to open/close at a pivot point on an end portion in the −X direction of the image reading apparatus 10. When the automatic transport device 40 is set in an open orientation, a first glass member 14 and a second glass member 16 described later become open.

In the following descriptions, a position on the second glass member 16 in which the information on the document G is read during the transport is simply referred to as the reading position.

In the automatic transport device 40, a transport route T through which the document G is transported by the document transport unit 46 is formed. The transport route T is formed in the shape of C from the document tray 42 to the discharge tray 44 in a view from the +X direction to the −X direction.

The document transport unit 46 is an example of a transport unit that transports the document G such that the document G is brought into contact with the later-described second glass member 16 in a position H (FIG. 5) in the transport direction of the document G and the document G is brought into contact with a later-described sheet member 26 in a position C (FIG. 5) in the transport direction. The document transport unit 46 includes multiple pairs of transport rollers 48 and a press member 56 (FIG. 4) inhibiting the document G from waving during the reading.

In the transport route T, one of the pairs of transport rollers 48 positioned upstream of the reading position of the document G in the transport direction that is in a position closest to the reading position is a first pair of transport rollers 52. In the transport route T, one of the pairs of transport rollers 48 positioned downstream of the reading position of the document G in the transport direction that is in a position closest to the reading position is a second pair of transport rollers 54. The first pair of transport rollers 52 and the second pair of transport rollers 54 each have rotation shafts along the X direction and are rotated by a not-illustrated motor.

Figure 2:
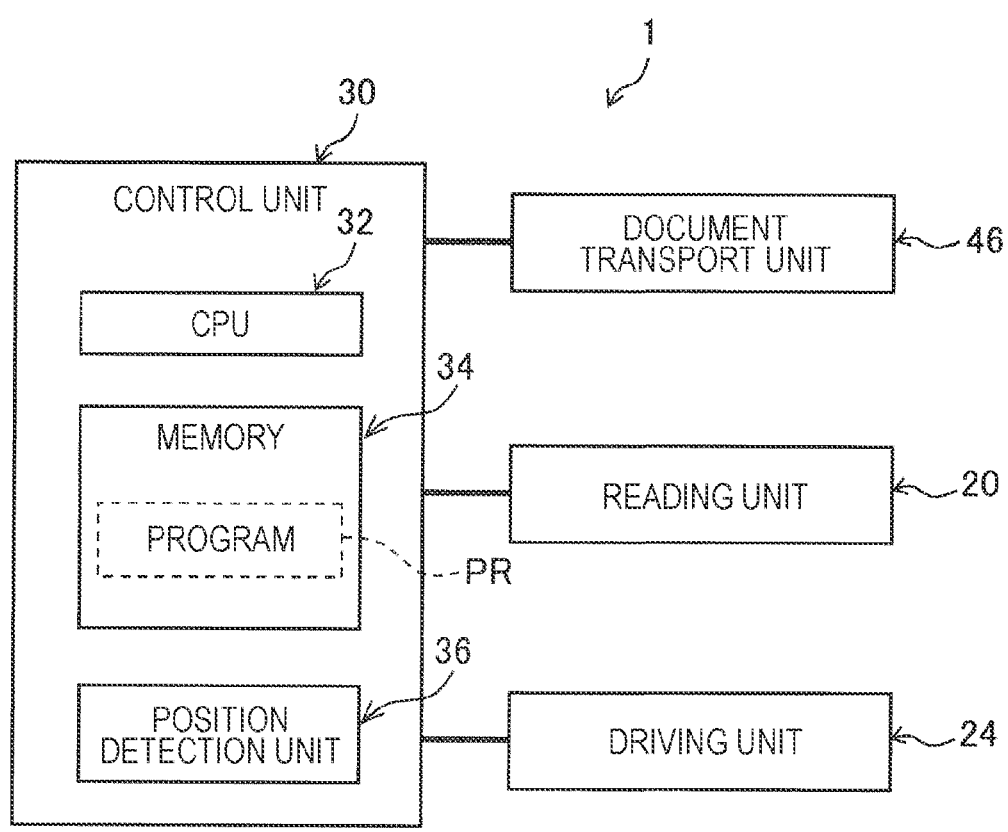
FIG. 2 is a block diagram of the scanner of Embodiment 1.

The image reading apparatus 10 includes a main body frame 12, the first glass member 14, a middle portion 15 (FIG. 4), the second glass member 16, a guide shaft 18, a support frame 19, a reading unit 20, a driving unit 24 (FIG. 2), the sheet member 26, an original point member 28 (FIG. 3), and a control unit 30 (FIG. 2).

The main body frame 12 is an example of a frame that surrounds the later-described second glass member 16 from the X direction and the Y direction. The main body frame 12 includes a housing 12A forming an outer portion of the image reading apparatus 10 and an internal frame 12B forming a skeleton portion of the image reading apparatus 10 in the housing 12A.

The first glass member 14 is a member including a top surface on which the document G is mounted. The second glass member 16 is arranged in the −Y direction with respect to the first glass member 14. The document G transported by the automatic transport device 40 passes above the second glass member 16. The middle portion 15 is positioned between the first glass member 14 and the second glass member 16.

The guide shaft 18 is an example of a shaft along the Y direction, which is the moving direction of the reading unit 20. The guide shaft 18 is a cylindrical member extending along the Y direction. Two end portions of the guide shaft 18 in the Y direction are provided on the main body frame 12. The guide shaft 18 thus guides the reading unit 20 in the Y direction during the movement. The guide shaft 18 extends in the Y direction while passing through a position slightly offset in the −X direction from the center of the reading unit 20 in the X direction.

The support frame 19 is provided on each of two end portions in the X direction with respect to the guide shaft 18 in the internal frame 12B and supports the two end portions of the reading unit 20 in the X direction.

Details of the reading unit 20, the sheet member 26, the original point member 28, and the control unit 30 are described later.

Figure 3:
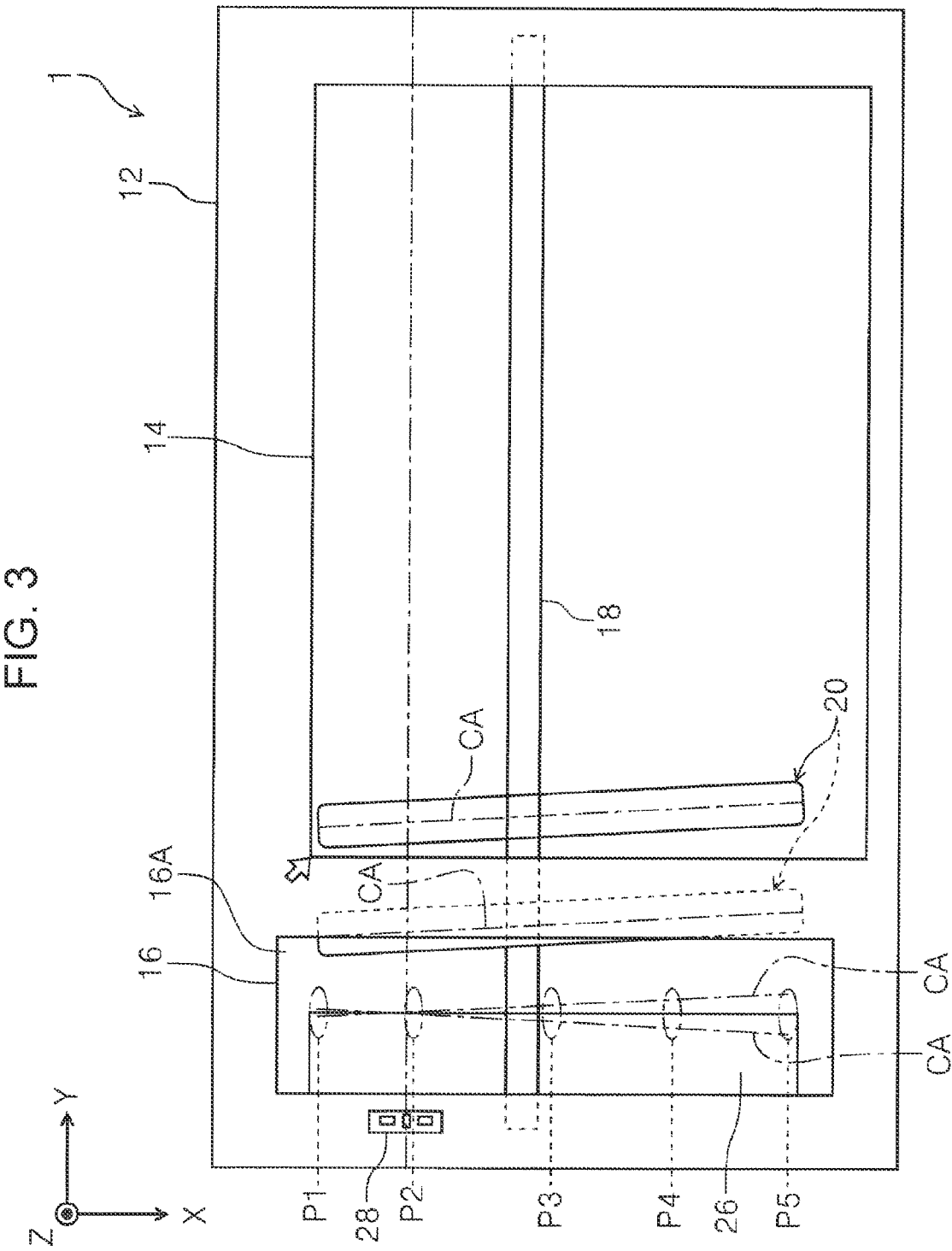
FIG. 3 is a plan view schematically illustrating arrangement of a sheet member and a reading unit in the scanner of Embodiment 1.

As illustrated in FIG. 3, the first glass member 14 is a platen on which the document G is mounted and has a size that allows the whole document G to be mounted thereon. For example, the first glass member 14 is a rectangular colorless transparent glass plate. The direction of a long edge of the first glass member 14 is along the Y direction in which the guide shaft 18 extends. The first glass member 14 is supported by the main body frame 12. The information on the document G mounted on the first glass member 14 is read by the reading unit 20 with the first glass member 14 in between.

The second glass member 16 is an example of a transparent member and formed of a rectangular colorless transparent glass plate. The second glass member 16 includes a top surface 16A with which the transported document G is temporarily brought into contact. The length of the second glass member 16 in the Y direction is shorter than the length of the document G in the Y direction. The length of the second glass member 16 in the X direction is longer than the length of the document G in the X direction. The second glass member 16 is supported by the main body frame 12 surrounding the second glass member 16 in the X direction and the Y direction. The information on the document G facing the second glass member 16 in the Z direction is read by the reading unit 20 with the second glass member 16 in between.

In this embodiment, when it is possible to appreciate the color and the shape of an object irradiated with visible light that is observed through a certain member, this "certain member" is referred to as a "transparent member".

As illustrated in FIG. 1, the reading unit 20 is formed in a rectangular shape in which the dimension in the X direction is longer than the dimension in the Y direction. The reading unit 20 is guided by the guide shaft 18 in the Y direction. Thus, the reading unit 20 can be moved in the Y direction as a moving direction along the transport direction of the document G.

The reading unit 20 reads the document G while being static on the second glass member 16. Additionally, the reading unit 20 reads the document G while being moved in the Y direction with respect to the first glass member 14. In other words, the reading unit 20 is configured to be able to read the information on either one of the document G mounted on the first glass member 14 and the document G passing above the second glass member 16 depending on the position in the Y direction.

The reading unit 20 is arranged in the −Z direction with respect to the first glass member 14 and the second glass member 16. The reading unit 20 is supported by the support frame 19 from below with a carriage 21 in between. For example, the reading unit 20 is formed as an image sensor performing reading by a contact image sensor (CIS) method. The width of the reading unit 20 in the X direction has a size that allows the almost whole first glass member 14 in the X direction to be read.

The driving unit 24 (FIG. 2) includes a movement mechanism including a not-illustrated belt and pulley and a driving source including a not-illustrated stepper motor and the like, for example. The driving unit 24 is configured to be able to reciprocate the reading unit 20 in the +Y direction and the −Y direction with the stepper motor moving the carriage 21 by means of the movement mechanism.

As illustrated in FIG. 2, the control unit 30 functioning as a computer includes a central processing unit (CPU) 32, a memory 34, a position detection unit 36, and a not-illustrated storage and timer. The control unit 30 controls operations of the reading unit 20, the driving unit 24, and the document transport unit 46 based on information inputted to the control unit 30. The control on operations of the scanner 1 by the control unit 30 is described later.

The memory 34 is an example of a storage unit that stores various types of data. The memory 34 stores various types of data including a program PR to be executed by the CPU 32. In other words, the memory 34 is an example of a recording medium storing the program PR readable by a computer. Other examples of the recording medium may include a compact disc (CD), a digital versatile disc (DVD), a Blu-ray disc, a universal serial bus (USB) memory, and so on. The program PR can be deployed in a part of the memory 34.

The program PR is a program causing the CPU 32 to execute the later-described steps in the scanner 1.

The position detection unit 36 detects the position in the X direction and the position in the Y direction of an end portion of the later-described sheet member 26 in the +Y direction. In this case, the position in the X direction and the position in the Y direction of the carriage 21 and the position in the X direction and the position in the Y direction in which the reading by the reading unit 20 is performed correspond to each other. Thus, the position detection unit 36 detects the position in which the reading unit 20 performs the reading by detecting the position of the carriage 21. That is, the position detection unit 36 is capable of detecting the position of the end of the sheet member 26 in the +Y direction with the reading unit 20 reading the sheet member 26 while being moved in the +Y direction. The position detection unit 36 functions when the CPU 32 executes the later-described steps.

As illustrated in FIG. 3, the sheet member 26 on the second glass member 16 is in a rectangular shape in which the dimension in the X direction is longer than the dimension in the Y direction. The sheet member 26 is arranged on the second glass member 16. The length of the sheet member 26 in the X direction is shorter than the length of the second glass member 16 in the X direction. The length of the sheet member 26 in the Y direction is shorter than the length of the second glass member 16 in the Y direction. The sheet member 26 is fixed on the second glass member 16 by an adhesive layer 29 (FIG. 5).

When the sheet member 26 is fixed on the top surface 16A by the adhesive layer 29, an error in dimensions of parts and an error in assembly may be a cause of variation in the positional accuracy of the sheet member 26.

Figure 5:
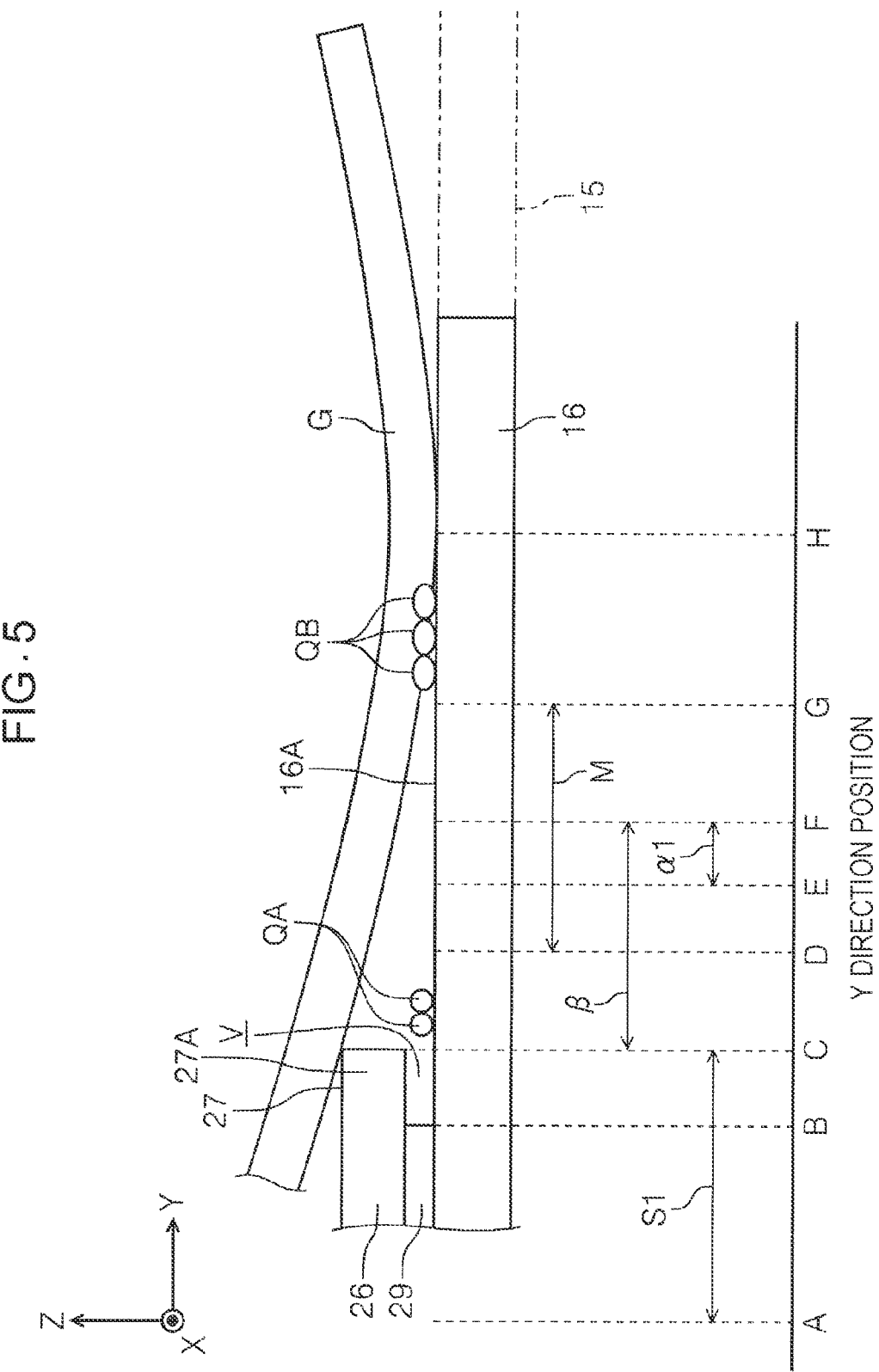
FIG. 5 is a schematic diagram illustrating positions in a Y direction in the scanner of Embodiment 1.

As illustrated in FIG. 5, the sheet member 26 is a member forming a clearance between the second glass member 16 and the document G so as to prevent a part of the document G that is upstream of a part read by the reading unit 20 (FIG. 1) from being put in contact with the top surface 16A of the second glass member 16. The thickness of the sheet member 26 in the Z direction is set to be from 0.1 mm to 0.7 mm, for example, and is set to 0.5 mm, for instance. In FIG. 5, the constituents are illustrated in size different from an actual dimensional ratio in order to make the configurations of the constituents clear.

Two end portions in the X direction and two end portions in the Y direction of the sheet member 26 are collectively referred to as edge portions 27. One of the edge portions 27 that is a portion closer to the position C (FIG. 5) described later is referred to as an edge portion 27A. The edge portion 27A is a portion positioned in the end portion in the +Y direction out of the edge portions 27.

The adhesive layer 29 is not provided between the edge portion 27A and the second glass member 16. In other words, the sheet member 26 is not adhered to the second glass member 16 from the position C as the end of the sheet member 26 in the +Y direction to a position B at a predetermined length away from the position C in the −Y direction and thereby form a space V.

The sheet member 26 is preferably formed of a material with a high light transmittance. The sheet member 26 is preferably formed of a material with a low friction coefficient so as not to apply an excessive load to the transport of the document G. Additionally, in order to inhibit the sheet member 26 from being charged due to contact with the document G, the sheet member 26 may be ground-connected.

As illustrated in FIG. 3, on the main body frame 12, the original point member 28 is attached in a position that is in the −Y direction with respect to the second glass member 16 and in the −X direction with respect to the guide shaft 18. The original point member 28 is attached in the −Z direction with respect to the main body frame 12 and can be read by the reading unit 20. In FIG. 3, in order to clearly illustrate the arrangement of the original point member 28, the original point member 28 is illustrated in a state transparent in the +Z direction.

As described above, the original point member 28 is provided on the main body frame 12 as an example of a reference member. The original point member 28 is used to identify the position of the reading unit 20 in the Y direction as the moving direction. Additionally, the original point member 28 is used when a first pixel of the reading unit 20 is determined.

In a region read by the reading unit 20 in the scanner 1, the end portion in the −X direction and the end portion in the −Y direction are set as the first pixel; for this reason, the original point member 28 is preferably arranged in a place close to the first pixel. When the original point member 28 is attached in the endmost position in the −X direction on the main body frame 12, the attached region may be small, and the attachment strength of the original point member 28 may be reduced. Therefore, the original point member 28 is attached in a position that is a position in the −X direction with respect to the guide shaft 18 and in the +X direction with respect to the end portion of the second glass member 16 in the −X direction.

In this case, positions P1, P2, P3, P4, and P5 may be considered as detection positions in the X direction for a case of detecting the position of the sheet member 26, for instance. As indicated by dashed-dotted lines, the positions P1, P2, P3, P4, and P5 do not mean points but mean tiny reading regions and are illustrated as oval regions. The positions P1, P2, P3, P4, and P5 are aligned in this order from the −X direction to the +X direction. The position P2 is arranged in a substantially middle point between the position P1 and the position P3, and the position P4 is arranged in a substantially middle point between the position P3 and the position P5.

The position P1 is the position of the −X direction end portion of the sheet member 26.

The position P2 is the position of a portion offset in the +X direction from the center of the original point member 28 in the X direction.

The position P3 is the position of a portion offset in the +X direction from the guide shaft 18 and is a position in substantially the center of the second glass member 16 in the X direction.

The position P4 is the position of a portion in the +X direction with respect to the position P3 and in the −X direction with respect to the later-described position P5.

The position P5 is the position of the +X direction end portion of the sheet member 26.

For example, the reading unit 20 is moved in the +Y direction based on the position P2, in which the original point member 28 is arranged, as a reference position in the X direction. In this case, due to a cause such as an error in assembly and an error in the movement in the Y direction as a sub scanning direction, a central axis CA of the reading unit 20 extending in a main scanning direction is likely to be tilted in a direction crossing the X direction. Additionally, the tilt direction of the central axis CA is not constant in the +Y direction and may be changed during the movement in the +Y direction.

An amount of the misalignment of the position in the Y direction read by the reading unit 20 due to the tilt of the central axis CA of the reading unit 20 in the X direction is greater as being closer to the end portion of the reading unit 20 in the X direction. In other words, the amount of the misalignment of the position in the Y direction read by the reading unit 20 is the smallest in the position P2 closest to the original point member 28. Therefore, in this embodiment, for example, when the position of the end of the sheet member 26 in the +Y direction is detected, the position of the sheet member 26 is set based on a result of the reading in the position P2 in the X direction. The reading in the position P2 reduces an effect of each error included in the reading position.

Figure 4:
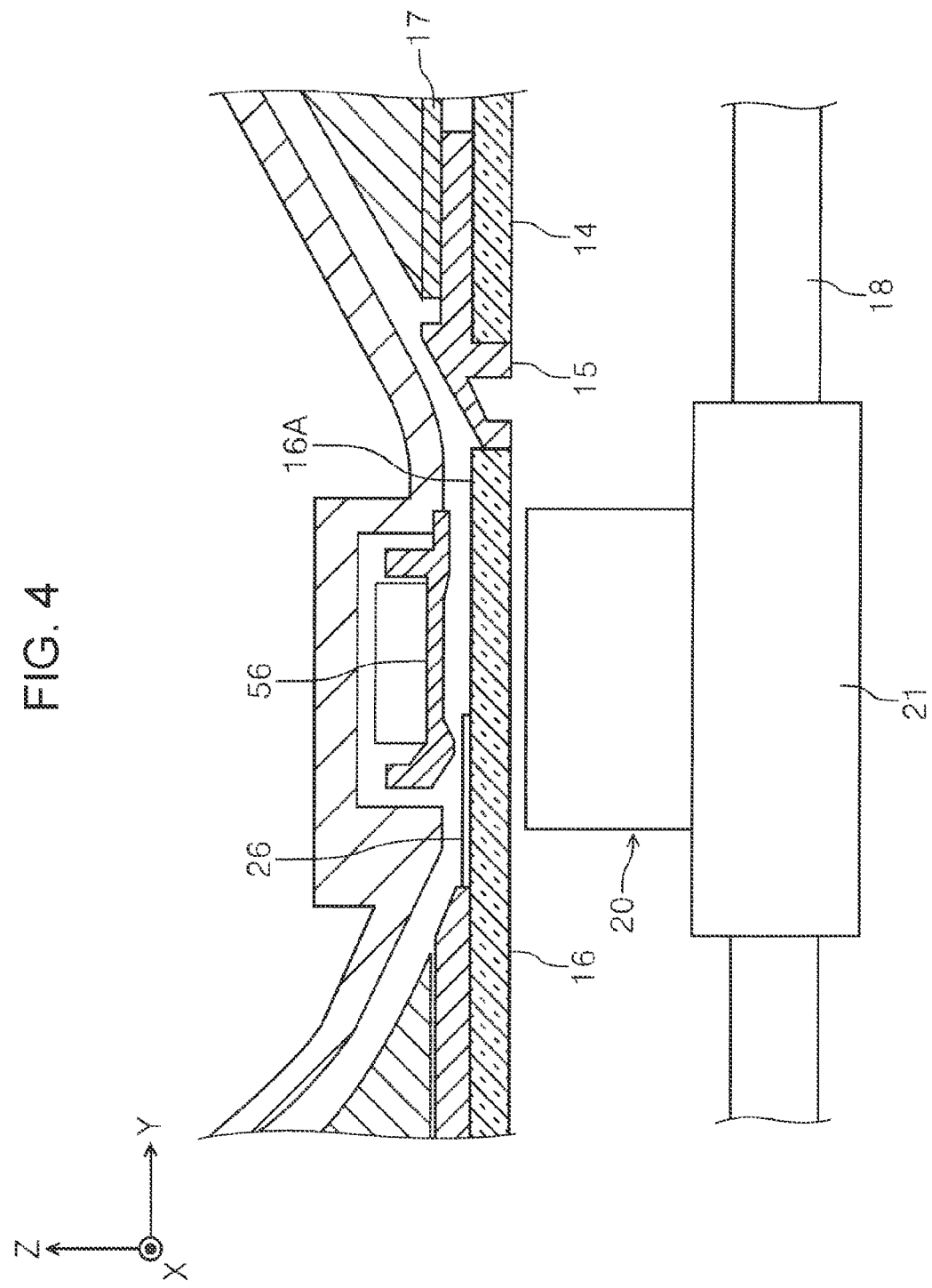
FIG. 4 is a partial vertical longitudinal sectional view illustrating a reading position and a peripheral portion of the reading position in the scanner of Embodiment 1.

As illustrated in FIG. 4, the press member 56 is provided in a position that is a position facing the top surface 16A of the second glass member 16 in the Z direction and is in the +Y direction with respect to the sheet member 26.

The press member 56 is an example of a background member. The color of the press member 56 is different from the color of the sheet member 26. The color of the adhesive layer 29 (FIG. 5) is different from the color of the press member 56.

In this case, "two objects have different colors" in this embodiment means a case in which ΔE* between the two colors are 3 or more, or more preferably 8 or more when the color of each object is measured based on JIS Z8781-4.

FIG. 5 schematically illustrates the position in the Y direction of each of the document G, the second glass member 16, the sheet member 26, and the adhesive layer 29. FIG. 5 is a schematic diagram, and sizes of the constituents are partially changed in order to make the arrangement relationship clear. That is, the ratio of the dimensions of the members and the constituents illustrated in FIG. 5 is different from the actual ratio. Additionally, FIG. 5 schematically illustrates paper dust QA and sticky dust QB on the second glass member 16. The paper dust QA and the sticky dust QB are also enlarged in the illustration and not intended to indicate the actual ratio.

For example, the paper dust QA may fall onto a periphery of the end portion of the sheet member 26 in the +Y direction. The sticky dust QB that falls from an image portion formed by ink or the like or that is transferred glue originally attached on the document G may be attached to a peripheral portion of the position H in which the document G and the second glass member 16 are brought into contact with each other, for example.

A position A to the position H in the Y direction are described. The position A to the position H are aligned in this order. The position A to the position H are not arranged at regular intervals. In a case of correcting a reference position E as a reference for the reading position, the reading unit 20 (FIG. 1) performs the reading from the position A to the position H.

The position C in the end of the sheet member 26 in the +Y direction is an example of a second position. When the position C is expressed by a variable in the Y direction, it is simply expressed as Y. In this embodiment, a position F at a predetermined distance β [mm] away from the position C is newly set as the position read by the reading unit 20. That is, the position F corresponds to the corrected position of the reference position E.

The position of the end of the adhesive layer 29 in the +Y direction is the position B. As already described, the position B is positioned in the −Y direction with respect to the position C.

A position in which the reading of the end portion of the sheet member 26 is started is the position A. The position A is away from the position C by an offset amount S1. In this embodiment, S1=−3 mm, for example.

The reference position E is an initial position to be read by the reading unit 20 that is set by the control unit 30 in advance. In other words, the reference position E is the reading position before the correction.

The position F is, as described above, the reading position after the correction that is corrected by reading the position of the end of the sheet member 26. The position F is an example of a third position. When the position F is expressed using the variable Y, it is Y+β. An offset amount between the reference position E and the position F in the Y direction is α1.

The position F is a position between the later-described position H and position C in the moving direction of the document G. The position F is a position in which the document G is out of contact with the sheet member 26 and the second glass member 16. In this case, the reading unit 20 reads the document G transported by the document transport unit 46 (FIG. 1) in the position F.

A range in which the reading unit 20 can perform the reading well with respect to the reading position F is M [mm]. The position of an end of the range M in the −Y direction is a position D. The position of an end of the range M in the +Y direction is a position G. The position F is positioned in the midpoint of the position D and the position G.

The position H in which the document G is put in contact with the top surface 16A is an example of a first position. In this case, the position F is expressed as the reference position E+α1=Y+β+S1.

The position H is a position away from the reference position E by an amount of a set value, for example. In this embodiment, it is set as a position S2 corresponding to the position H=the reading position+1 mm, for example.

The control unit 30 controls the movement in the Y direction and the reading operation of the reading unit 20. Now, each control by the control unit 30 is described.

The control unit 30 identifies the position F according to the position of the sheet member 26 in the Y direction detected by the reading unit 20.

Figure 7:
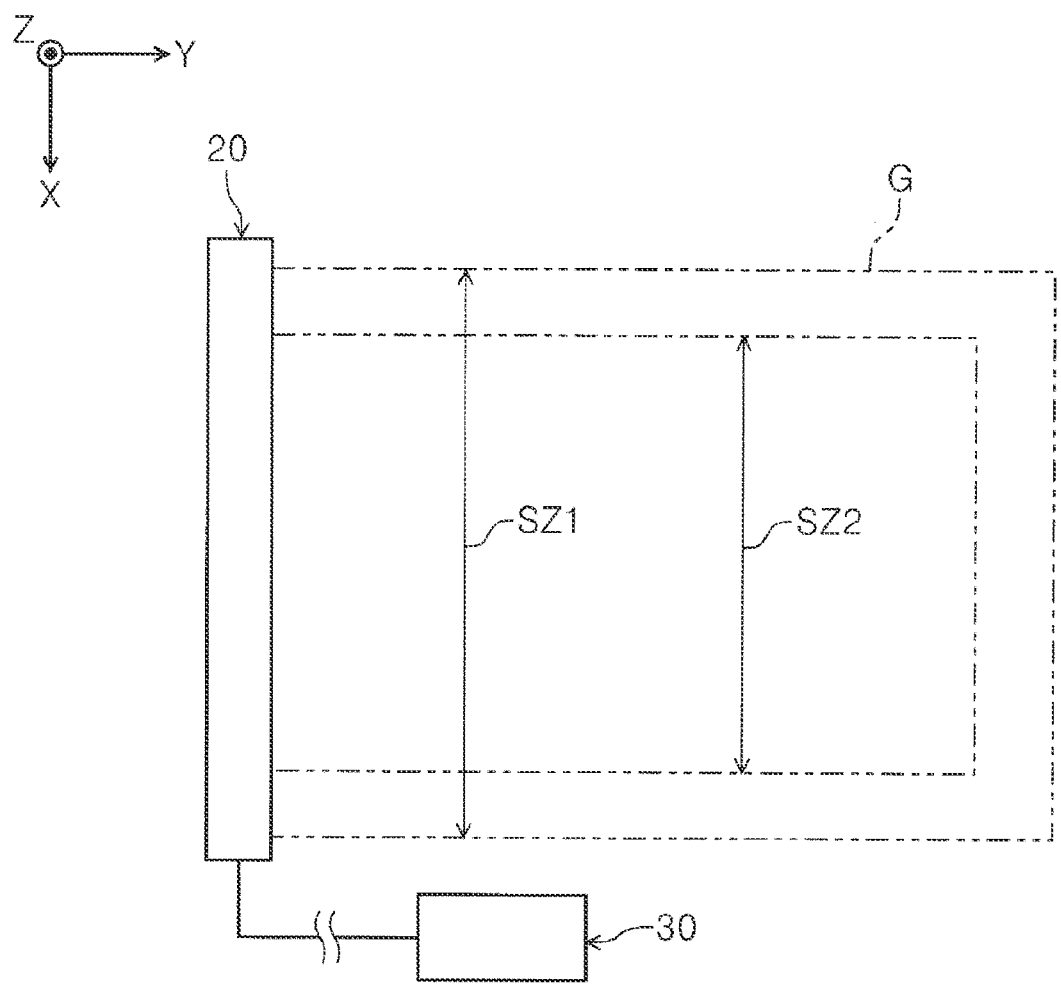
FIG. 7 is a schematic diagram illustrating a difference in size between regions read by the scanner of Embodiment 1.

As illustrated in FIG. 7, the control unit 30 detects the position of the sheet member 26 (FIG. 3) in the Y direction based on data on a second size SZ2 obtained from the reading unit 20. In the second size SZ2, the size in the X direction as a width direction orthogonal to the moving direction of the document G is smaller than that of a first size SZ1.

The first size SZ1 is the maximum size of the document G to be read by the reading unit 20.

As illustrated in FIG. 4, a facing plate 17 facing the first glass member 14 is provided in a position in the +Z direction with respect to the first glass member 14.

The facing plate 17 is used for so-called shading correction, and a resin plate in white, gray, black, or the like or a metal plate painted in white, gray, black, or the like may be used, for instance.

The control unit 30 (FIG. 2) generates correction data based on a difference between a reading value at which the reading unit 20 reads the facing plate 17 and a reading value at which the reading unit 20 reads the document G.

The control unit 30 controls the reading unit 20 to perform the reading for the shading correction and the reading for the detection of the position of the sheet member 26 in the Y direction during the movement of the reading unit 20. In the X direction, the reading size for the shading correction is greater than the reading size for the detection of the position of the sheet member 26 in the Y direction.

The control unit 30 detects the position of the sheet member 26 in the Y direction based on data on a position overlapped with the original point member 28 (FIG. 3) in the X direction. Specifically, the position P2 (FIG. 3) read by the reading unit 20 corresponds to the position overlapped with the original point member 28 in the Y direction.

The control unit 30 causes the reading unit 20 to read the document G in either one of a first mode and a second mode that have different reading resolutions in the transport direction. For example, the resolution in the first mode is 600 dpi, and the resolution in the second mode is 300 dpi. Selection of the first mode or the second mode is made by a user, for example. In this case, the position F (FIG. 5) in the first mode and the position F in the second mode are set in the same position. That is, the position F is constant regardless of which mode, the first mode or the second mode, is selected.

The control unit 30 changes the position F in accordance with the number of the documents G transported by the document transport unit 46. That is, when the number of the documents G exceeds the set number, the end portion of the sheet member 26 is assumed to be abrased, and the position of the end of the sheet member 26 is detected again to perform the control to correct the position F.

Figure 6:
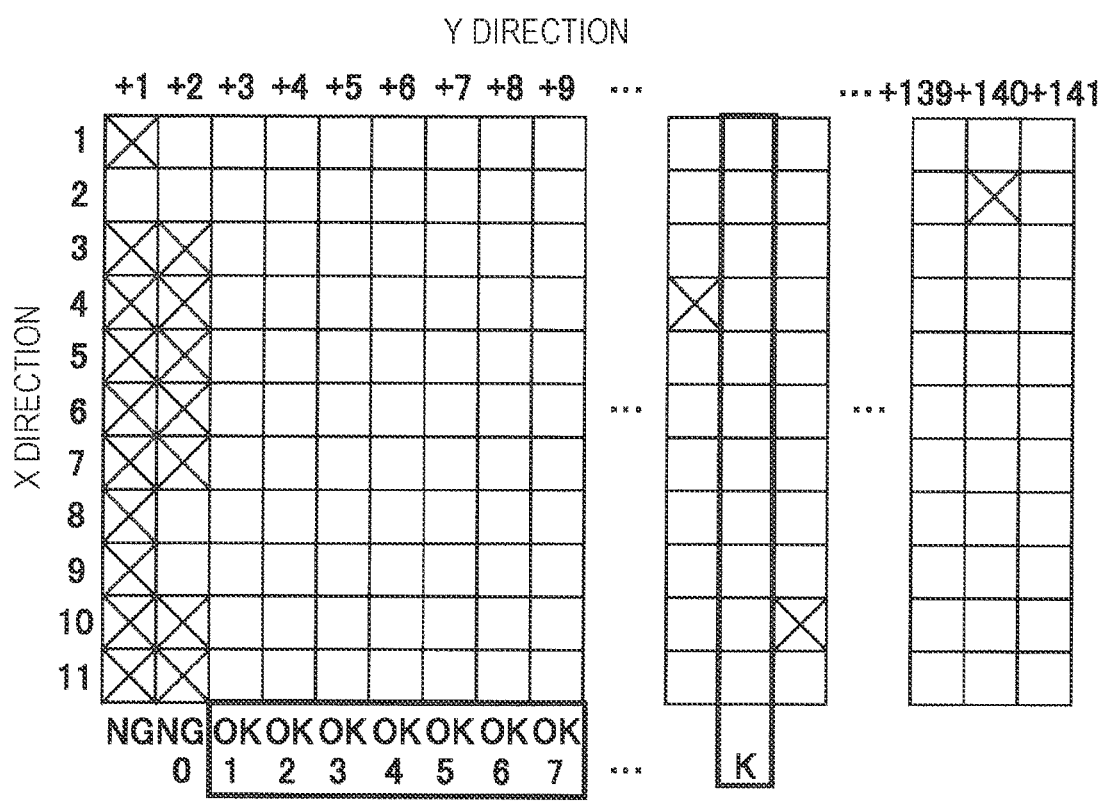
FIG. 6 is a schematic diagram illustrating a detection result of an end portion of the sheet member read by the scanner of Embodiment 1.

FIG. 6 schematically illustrates a detection result of a case in which the reading unit 20 performs the reading of the sheet member 26 in a monochrome mode of 600 dpi×600 dpi, for example. For example, there are 11 pixels in the X direction, and there are 141 pixels in the Y direction. Illustration of a part of the result in the Y direction is omitted. The result read by the reading unit 20 is binarized with a threshold of 50.

A detection result of a position of one pixel is indicated in a square. A portion in which only a square is illustrated means a case in which the detection result is equal to or smaller than the threshold. A portion in which crossing diagonal lines are drawn in a square means a case in which the detection result is greater than the threshold. That is, this means that a square in which no diagonal lines are displayed is determined as a position in which the sheet member 26 does not exist, and a square in which diagonal lines are displayed is determined as a position in which the sheet member 26 exists.

NG means a state in which a square of equal to or smaller than the threshold exists and it is impossible to identify the position of the end of the sheet member 26. OK means a state in which only squares of greater than the threshold exist sequentially to the seventh square in the Y direction and it is possible to identify the position of the end of the sheet member 26. FIG. 6 illustrates that the third position from the beginning of the reading in the Y direction is detected as the position of the end of the sheet member 26 in the +Y direction, for example.

A K-th position from the first position that is detected in the +Y direction indicates the reading position after the correction. In FIG. 6, it is estimated that there is detected a foreign substance such as paper dust in a position of a square that appears sporadically in a third or later position in the +Y direction and in which diagonal lines are drawn.

Next, operations of the scanner 1 of Embodiment 1 are described.

Figure 8:
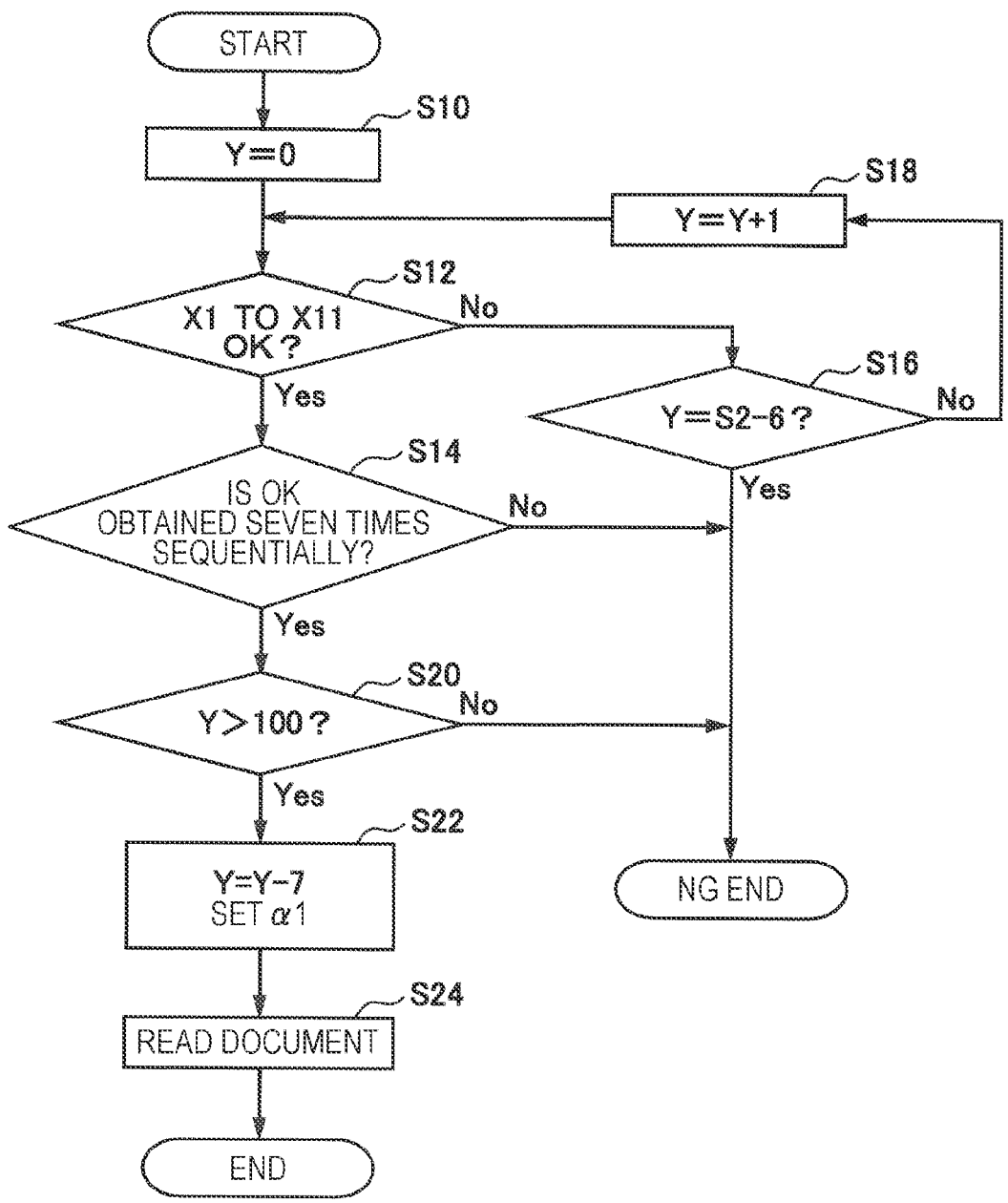
FIG. 8 is a flowchart indicating a procedure of processing executed by the scanner of Embodiment 1.

FIG. 8 is a flowchart indicating a procedure of processing in a case of correcting the reference position E to the position F by detecting the position C of the end of the sheet member 26 in the +Y direction.

FIGS. 1 to 5 are referred for the constituents and the members included in the scanner 1, and description of individual figure numbers is omitted. Each processing indicated in FIG. 8 is executed with the CPU 32 reading and deploying the program PR from the memory 34 to execute.

In step S10, the CPU 32 moves the reading unit 20 to the position A with reference to the position P2. Additionally, assuming that the position A is a 0-th position of the variable Y in the +Y direction, Y=0 is set. Then, the process proceeds to step S12.

In step S12, the CPU 32 reads 11 pixels in the +X direction by means of the reading unit 20 and determines whether the binarized values from X1 to X11 are all 0. When the binarized values are all 0 (S12: Yes), the process proceeds to step S14. When even one 1 appears (S12: No), the process proceeds to step S16.

In step S14, the CPU 32 detects the position of the sheet member 26 by reading the sheet member 26 while moving the reading unit 20 in the +Y direction. Specifically, the CPU 32 determines whether a result of OK in which the 11 pixels in the +X direction all obtain 0 is sequentially obtained seven times in the +Y direction, that is, for the seven pixels.

When OK is sequentially obtained seven times (S14: Yes), the process proceeds to step S20. When even one of seven times is NG (S14: No), it is determined that there is a problem in measurement or there is a problem in the reading portion and determined as NG end, and the program PR is terminated. In this process, a not-illustrated display unit or speaker may be used to notify of the NG end.

In step S16, the CPU 32 determines whether the position corresponding to the variable Y reaches a position six pixels before the position H corresponding to the already-described set value S2. When the value of the variable Y is S2−6 (S16: Yes), there is no OK portion within the read region. Therefore, it is determined that there is a problem in measurement or there is a problem in the read portion and determined as NG end, and the program PR is terminated. In this process, a not-illustrated display unit or speaker may be used to notify of the NG end. When the value of the variable Y is a value smaller than S2−6 (S16: No), the process proceeds to step S18.

In step S18, the CPU 32 increments the value of the variable Y by one, and the process proceeds to step S12.

In step S20, the CPU 32 determines whether OK is sequentially obtained until a position in which the variable Y is greater than 100. When the variable Y is greater than 100 (S20: Yes), the process proceeds to step S22. When the variable Y is 100 or smaller (S20: No), it is determined that the reading region has an abnormality and determined as NG end, and the program PR is terminated. In this process, a not-illustrated display unit or speaker may be used to notify of the NG end.

In step S22, the CPU 32 stores a value of Y=Y−7 so as to set the 0-th position to the position of the end of the sheet member 26 in the +Y direction. The offset amount α1 in the Y direction of the position F after the correction with respect to the reference position E is expressed as α1=(Y+β)+S1 by using already-described β and the offset amount S1 at the beginning of the inspection. The CPU 32 stores this value of α1 as the set value for the correction. That is, the reading position after the correction is identified based on the detected position of the sheet member 26. Then, the process proceeds to step S24.

In step S24, the CPU 32 arranges the reading unit 20 in the position F after the correction and causes the reading unit 20 to read the document G. That is, the reading unit 20 reads the document G in the identified reading position. Then, the program PR is terminated successfully.

As described above, according to the scanner 1 of Embodiment 1, the position F to be the reading position is identified according to the detection position of the sheet member 26. In this case, even when the sheet member 26 is misaligned from a set attachment position, the position F is kept in a position at a substantially constant distance away from the sheet member 26, and thus the distance between the document G and the second glass member 16 in the position F as the reading position is maintained. Consequently, it is possible to correctly read the document G.

According to the scanner 1 of Embodiment 1, the position of the sheet member 26 is detected based on the second size SZ2 proportionally smaller than the first size SZ1. Consequently, it is possible to increase the speed of processing required to detect the sheet member 26.

According to the scanner 1 of Embodiment 1, the position F can be identified by using a result of the shading correction performed. Consequently, it is possible to accurately identify the position F.

According to the scanner 1 of Embodiment 1, since the position of the sheet member 26 is detected based on data on the position P2 overlapped with the original point member 28, even when the reading unit 20 is tilted in the X direction, variation in the reading position in the moving direction due to the tilt of the reading unit 20 can be reduced. Consequently, it is possible to accurately identify the position F.

According to the scanner 1 of Embodiment 1, there is no need to execute processing of setting the position F in each of the first mode and the second mode. Consequently, it is possible to shorten the processing time for setting the position F.

According to the scanner 1 of Embodiment 1, since the color of the sheet member 26 is different from the color of the press member 56, it is possible to make it easy to optically detect the sheet member 26.

According to the scanner 1 of Embodiment 1, when the sheet member 26 is fixed on the second glass member 16 with the adhesive layer 29 in between, even if the adhesive layer 29 protrudes outside a fixing target region on the inner side of the sheet member 26, the adhesive layer 29 is held in a space V (FIG. 5) in which no adhesive layer 29 is provided, and thus the protrusion of the adhesive layer 29 outside the edge portion of the sheet member 26 can be inhibited. Consequently, it is possible to inhibit reduction in the accuracy of detecting the position of the sheet member 26.

According to the scanner 1 of Embodiment 1, even when the adhesive layer 29 reaches the edge portion of the sheet member 26, since the color of the adhesive layer 29 is different from the color of the press member 56, it is possible to reduce the possibility of false detection of the sheet member 26 as the press member 56.

It is predicted that abrasion of the sheet member 26 is progressed as the number of the documents G transported by the document transport unit 46 is increased. In this case, according to the scanner 1, even when the abrasion of the sheet member 26 is progressed, the position F as the reading position can be corrected with reference to the sheet member 26 by changing the position F in accordance with the number of the documents G. Consequently, it is possible to read the document G in an optimal position.

According to a method of controlling the scanner 1 of Embodiment 1, it is possible to obtain operations and effects similar to that of the scanner 1 of Embodiment 1. Additionally, according to a non-transitory computer-readable storage medium storing a program causing a computer to control the scanner 1 of Embodiment 1, it is possible to obtain operations and effects similar to that of the scanner 1 of Embodiment 1.

Modification 1

A modification 1 of the scanner 1 of Embodiment 1 is described.

In the scanner 1 of the modification 1, the original point member 28 is attached to be aligned with the position P3 overlapped with the guide shaft 18 in the X direction instead of the position P2. The control unit 30 detects the position of the sheet member 26 based on data on the position P3.

In this case, according to the scanner 1 of the modification 1, since the original point member 28 can be arranged close to the guide shaft 18 having a relatively small amount of the tilt with respect to the X direction of the reading unit 20, the effect of the tilt of the reading unit 20 during the reading is reduced. Consequently, it is possible to accurately identify the position F.

Modification 2

A modification 2 of the scanner 1 of Embodiment 1 is described.

In the scanner 1 of the modification 2, the control unit 30 causes the reading of the document G in either one of the first mode and the second mode that have different resolutions of the document G in the transport direction. The position F in the first mode and the position F in the second mode are set in different positions.

In this case, according to the scanner 1 of the modification 2, it is possible to set a position proper for a resolution of each of the first mode and the second mode as the position F.

Embodiment 2

Next, the scanner 1 of Embodiment 2 is described with reference to the appended drawings. Constituents in common with the constituents of the scanner 1 of Embodiment 1 are denoted by the same reference numerals, and descriptions thereof are omitted.

The scanner 1 of Embodiment 2 is different from the scanner 1 of Embodiment 1 in that a step of reading the sheet member 26 is added when the number of the documents G transported by the document transport unit 46 exceeds a predetermined number. Except this configuration, the scanner 1 of Embodiment 2 has a similar configuration as that of Embodiment 1.

In the scanner 1 of Embodiment 2, when the number of the documents G transported by the document transport unit 46 exceeds a predetermined number, the control unit 30 causes the reading unit 20 to read the sheet member 26 and detects abrasion of the sheet member 26 according to the detected position of the sheet member 26.

Next, operations of the scanner 1 of Embodiment 2 are described.

Figure 9:
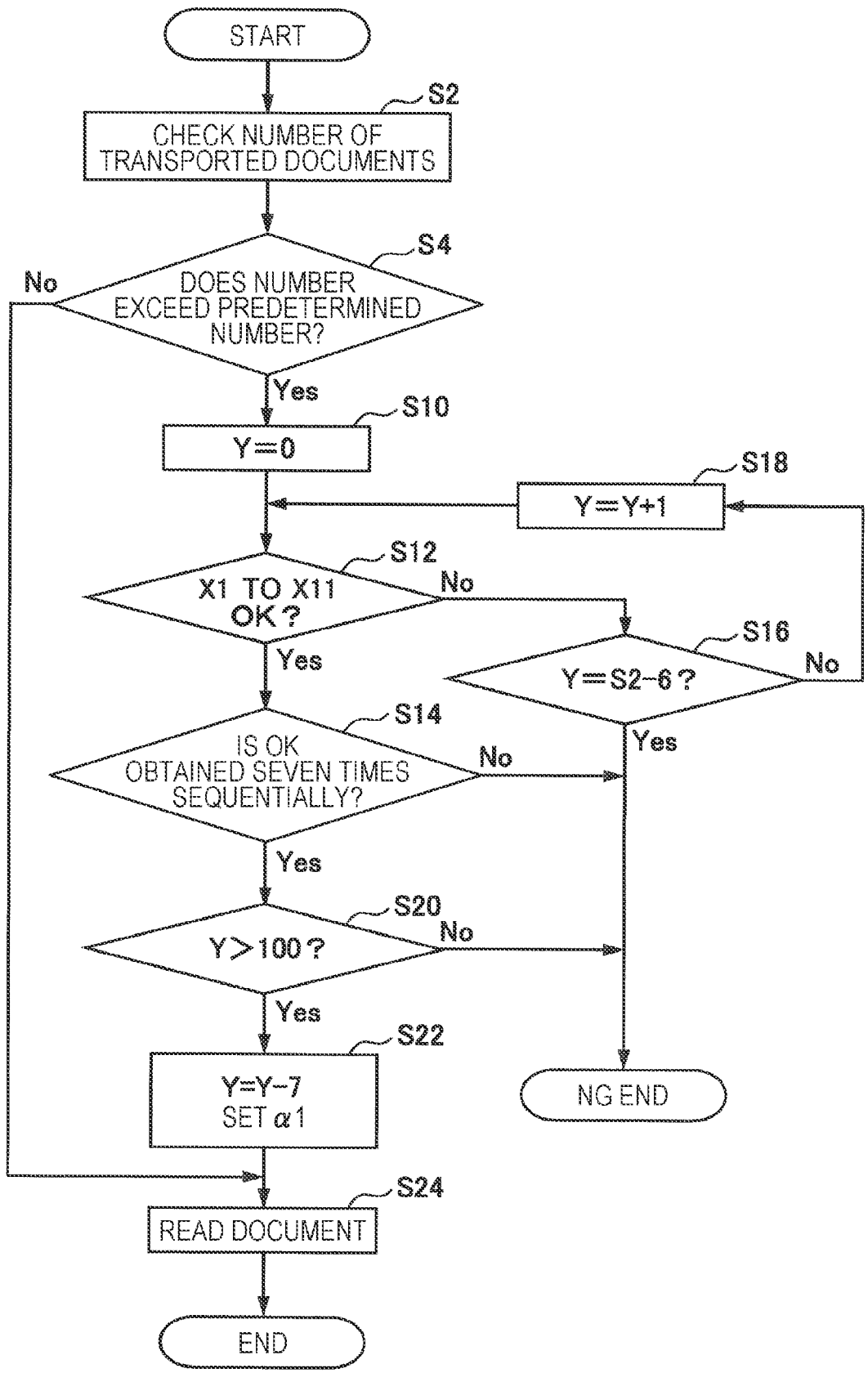
FIG. 9 is a flowchart indicating a procedure of processing executed by a scanner of Embodiment 2.

As illustrated in FIG. 9, in a flowchart of Embodiment 2, step S2 and step S4 are added to the flowchart of Embodiment 1 (FIG. 8).

In step S2, the CPU 32 checks the number of the documents G transported by the document transport unit 46. The number of the documents G is counted by a not-illustrated counter. Then, the process proceeds to step S4.

In step S4, the CPU 32 determines whether the number of the transported documents G exceeds a predetermined number. When the number of the transported documents G exceeds a predetermined number (S4: Yes), the process proceeds to step S10. When the number of the transported documents G is equal to or less than a predetermined number (S4: No), the process proceeds to step S24. Then, the reading of the document G is performed.

As described above, according to the scanner 1 of Embodiment 2, when the number of the transported documents G exceeds a predetermined number, and it is expected that abrasion occurs on the sheet member 26 put in contact with a part of the document G, the abrasion state of the sheet member 26 can be detected. Consequently, it is possible to encourage replacement of the sheet member 26.

The scanner 1 according to Embodiments 1 and 2 of the present disclosure basically has the configurations as described above; however, as a matter of course, it is also possible to change, combine, or omit a part of the configurations without departing from the gist of the present disclosure.

In the scanner 1, the size of the data in the X direction when reading the sheet member 26 is not limited to the second size and may be the first size. The size of the data in the X direction when reading the sheet member 26 may be equal to the reading size for the shading correction.

The control unit 30 may detect the position of the sheet member 26 based on data on a position not overlapped with the original point member 28. For instance, in the X direction, the position of the sheet member 26 may be detected in a position between the guide shaft 18 and the original point member 28.

In the scanner 1, as long as it is detectable, the color of the press member 56 may be the same as the color of the position of the sheet member 26. In the edge portion of the sheet member 26, as long as it is a position in which the reading by the reading unit 20 is not performed, the adhesive layer 29 may be provided between the edge portion of the sheet member 26 and the second glass member 16. The color of the adhesive layer 29 may be the same as the color of the press member 56.

The control unit 30 may not change the position F in accordance with the number of the documents G transported by the document transport unit 46.

In the scanner 1, the adhesive layer 29 may not be arranged between the second glass member 16 and the sheet member 26. For instance, a configuration in which the end portion of the sheet member 26 in the Y direction is bent in an L-shape, and a vertical portion of this bent portion is brought into contact with an end surface of the second glass member 16 in the Y direction may be applied.

As already described, when the sheet member 26 is colored, the reading of the sheet member 26 may be detected based on a difference in brightness values. When the sheet member 26 is transparent, for instance, the reading of the sheet member 26 may be detected based on a difference in states of advancing of light inside and outside the sheet member 26. The reading of the sheet member 26 may be detected by providing an identification pattern on the sheet member 26 and reading the identification pattern. The position of the end of the sheet member 26 may be identified by scanning a region of the second glass member 16 in which the sheet member 26 does not exist.

The determination processing may be executed in the second size by performing the reading by the reading unit 20 in the first size and trimming the obtained data. Otherwise, the reading unit 20 may perform the reading in the second size, and the determination processing may also be executed in the second size.

When the position F is changed in accordance with the number of the documents G, the sheet member 26 may be detected again once a predetermined number of the documents G are transported, or the correction into the position F may be made based on a data table prepared in advance without performing the detection again.

What is claimed is:

1. A reading apparatus, comprising:
   a transparent member;
   a frame surrounding the transparent member;
   a plate-shaped member arranged on the transparent member;
   a transporter including a pair of rollers and transporting a document in a transport direction;
   an image sensor that is provided with respect to the transparent member to be configured to move in a moving direction along the transport direction and that reads the document; and
   a controller controlling movement and reading operation of the image sensor, wherein
   the image sensor reads the document transported by the transporter at a reference position, which is an initial position for the image sensor to start reading the document, while the transporter transports the document in the transport direction,
   the document is brought into contact with the transparent member at a first position and is brought into contact with the plate-shaped member at a second position, which is positioned upstream of the first position in the transport direction,
   the document is out of contact with the plate-shaped member and the transparent member at the reference position,
   the second position is different from the reference position,
   the controller corrects the reference position to a third position based on the first position or the second position, and
   when a number of documents transported by the transporter exceeds a predetermined number, the controller causes the image sensor to read the plate-shaped member and detects abrasion of the plate-shaped member in accordance with a detected position of the plate-shaped member.

2. The reading apparatus according to claim 1, wherein
   based on data on a second size obtained from the image sensor, the second size having a width direction size orthogonal to the moving direction smaller than a width direction size of a first size, the controller detects a position of the plate-shaped member, and
   the first size is a maximum size of the document configured to be read by the image sensor.

3. The reading apparatus according to claim 2, wherein
the controller causes, during the movement of the image sensor, the image sensor to perform reading for shading correction and reading for detection of a position of the plate-shaped member, and
in the width direction, a reading size for the shading correction is greater than a reading size for the detection of a position of the plate-shaped member.

4. The reading apparatus according to claim 2, wherein
a reference member identifying a position of the image sensor in the moving direction is provided on the frame, and
the controller detects a position of the plate-shaped member based on data on a position overlapped with the reference member in the width direction.

5. The reading apparatus according to claim 4, wherein
a shaft along the moving direction that guides the image sensor during the movement is provided in the frame, and
based on data on a position overlapped with the shaft in the width direction, the controller detects a position of the plate-shaped member.

6. The reading apparatus according to claim 1, wherein
the controller causes the image sensor to read the document in either one of a first mode and a second mode that have different resolutions in the transport direction, and
the third position in the first mode and the third position in the second mode are set to a same position.

7. The reading apparatus according to claim 1, wherein
the controller causes the image sensor to read the document in either one of a first mode and a second mode that have different resolutions in the transport direction, and
the third position in the first mode and the third position in the second mode are set to different positions.

8. The reading apparatus according to claim 1, wherein
the transporter includes a background member in a position facing the transparent member, and
a color of the background member is different from a color of the plate-shaped member.

9. The reading apparatus according to claim 1, wherein
the plate-shaped member is fixed on the transparent member by an adhesive layer, and
the adhesive layer is not provided in a space between one edge portion of the plate-shaped member in a vicinity of the second position and the transparent member.

10. The reading apparatus according to claim 8, wherein
a color of an adhesive layer is different from the color of the background member.

11. The reading apparatus according to claim 1, wherein
the controller changes the third position in accordance with a number of the document transported by the transporter.

12. A reading apparatus, comprising:
a transparent member;
a frame surrounding the transparent member;
a plate-shaped member arranged on the transparent member;
a transporter including a pair of rollers and transporting a document such that the document is brought into contact with the transparent member in a first position in a transport direction of the document and the document is brought into contact with the plate-shaped member in a second position in the transport direction;
an image sensor that is provided with respect to the transparent member to be configured to move in a moving direction along the transport direction and that reads the document; and
a controller controlling movement and reading operation of the image sensor, wherein
the image sensor reads the document transported by the transporter in a third position between the first position and the second position in the moving direction, the third position in which the document is out of contact with the plate-shaped member and the transparent member,
the controller identifies the third position in accordance with a position of the plate-shaped member detected by the image sensor, and
when a number of the document transported by the transporter exceeds a predetermined number, the controller causes the image sensor to read the plate-shaped member and detects abrasion of the plate-shaped member in accordance with a detected position of the plate-shaped member.

13. The reading apparatus according to claim 1, wherein
the second position is an end portion of the plate-shaped member.

14. A reading apparatus, comprising:
a transparent member;
a frame surrounding the transparent member;
a plate-shaped member arranged on the transparent member;
a transporter including a pair of rollers and transporting a document in a transport direction;
an image sensor that is provided with respect to the transparent member to be configured to move in a moving direction along the transport direction and that reads the document; and
a controller controlling movement and reading operation of the image sensor, wherein
the image sensor reads the document transported by the transporter at a third position between a first position and a second position in the moving direction, while the transporter transports the document in the transport direction,
the document is brought into contact with the transparent member at the first position and is brought into contact with the plate-shaped member at the second position, which is positioned upstream of the first position in the transport direction,
the document is out of contact with the plate-shaped member and the transparent member at the third position,
the controller identifies the third position based on the first position or the second position,
the image sensor does not read the document at the second position, and
when a number of documents transported by the transporter exceeds a predetermined number, the controller causes the image sensor to read the plate-shaped member and detects abrasion of the plate-shaped member in accordance with a detected position of the plate-shaped member.

15. The reading apparatus according to claim 14, wherein
the plate-shaped member is fixed on the transparent member by an adhesive layer, and
the adhesive layer is not provided in a space between one edge portion of the plate-shaped member in a vicinity of the second position and the transparent member.

16. The reading apparatus according to claim 14, wherein when the number of the documents transported by the transporter exceeds the predetermined number, the controller changes the third position in accordance with the number of the documents transported by the transporter.

17. The reading apparatus according to claim 14, wherein the document is transported by the transporter to be positioned over first position.

\* \* \* \* \*